UNITED STATES PATENT OFFICE.

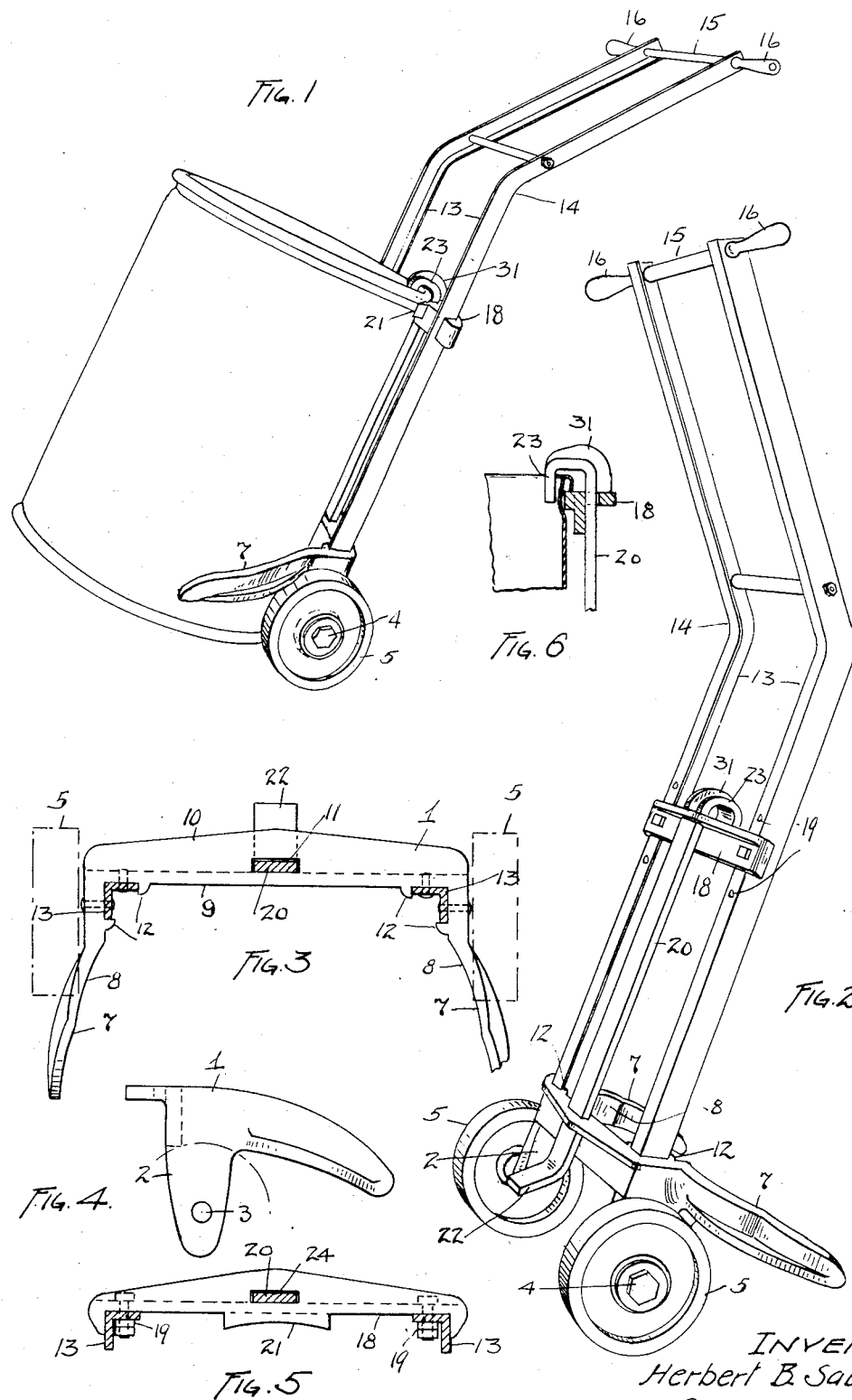

HERBERT B. SABIN, OF CLEVELAND, OHIO.

TRUCK FOR HANDLING METAL CONTAINERS AND THE LIKE.

1,358,881.　　　　Specification of Letters Patent.　　Patented Nov. 16, 1920.

Application filed October 15, 1919. Serial No. 330,770.

*To all whom it may concern:*

Be it known that I, HERBERT B. SABIN, a citizen of the United States, and a resident of Cleveland, county of Cuyahoga and State of Ohio, have invented a new and useful Improvement in Trucks for Handling Metal Containers and the like, of which the following is a specification, the principle of the invention being herein explained and the best of mode in which I have contemplated applying that principle, so as to distinguish it from other inventions.

The present invention relates to hand operated trucks of the type generally used with metal containers which are provided with an upper chime or reinforcing ring. More particularly the truck is adapted to handle the open end type of container such as is in general use in factories and machine shops for holding the material to be worked on. The truck itself is of the general two-wheel type but is so arranged that it is but slightly wider than the barrels to be handled and thus may be readily moved into small spaces. The truck is equipped with means for gripping and lifting the container from the floor and for so holding the container on the truck that the material will not be spilled during the moving and handling of the container. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a perspective view of the truck with the container in place thereon; Fig. 2 is a perspective view of the truck when standing alone, taken from the rear; Fig. 3 is a plan view of the base member; Fig. 4 is a side elevation of the base member; Fig. 5 is a plan view of the cross member; and Fig. 6 is a section through the clamping device.

The truck proper consists of a base member 1 which is provided with two downwardly extending ears 2 which have apertures 3 to receive the studs 4 which carry the wheels 5. These studs 4 extend through the wheels and through the apertures in the ears of the base and are held in place by means of nuts which are threaded on to inner ends of the studs. The base is also provided with two forwardly extending arms 7, the inner sides 8 of which are curved and adapted to partially encircle the container to be lifted. These arms 7 extend from the base above the ears which carry the wheels and are made wider than the ears so that the wheels run below the extending arms and are of approximately the same overall width. These arms also extend downwardly so that they contact with the floor to allow the truck to stand upright, as shown in Fig. 2.

This base is provided with a cross member 9 which is angular in shape and the horizontal portion 10 of the same is provided with a slot 11 in the center thereof. At each side on its inner face the frame has two raised lugs 12 to act as receiving members for the truck frame.

The truck frame consists of two side frame members 13 which are forced within the lugs on the base, and then bolted or riveted thereto. These frame members are preferably angle irons and at approximately half way of their length are bent backwardly at an obtuse angle as at 14. At the ends they are provided with a rod 15 which extends beyond the frame members and is provided with handles 16.

The means for gripping and holding the container comprise a cross bar 18 which is adjustably attached to the frame members by means of bolts passing through apertures 19 therein and a clamping member 20 described hereinafter. Usually three pairs of apertures 19 are provided, so spaced along the frame members that this cross bar may be placed at approximately the height of the standard sizes of containers. The usual containers employed in machine shops and factories are either 24, 26 or 28 inches high and the apertures in the frame members are made to correspond to these heights. On the forward face of this cross member is formed a curved lifting block 21 adapted to engage under the reinforcing ring or chime of the container. The clamping member holds the ring securely in place over such lifting block at all times. When the container has been lifted and is being moved there is no tendency toward forcing the clamping member upwardly so that the container hangs in position on the truck without the user having to continue to press down upon the clamping member. The clamping member is movably mounted through a slot 24 in the cross member, and the slot 11 in the base, and is provided with an outwardly turned or bent lower end 22. The upper end 23 of the clamping member is hook-shaped and extends downwardly over the lifting block, but spaced therefrom sufficiently to receive the top of the container therebetween. To prevent the clamping member from moving too low through the cross member, the head of the clamping member is provided with a reinforcing rib 31 which contacts the cross member to limit the downward position.

In using the truck it is moved up adjacent a container so that it stands upon its wheels and its forwardly extending arms with the lifting block under the reinforcing ring or chime, and with the clamping member over the edge of the container. By forcing down on the outwardly turned or bent end of the clamping member, this member engages over the container top and clamps the chime ring of the container tightly over the lifting block. By shoving inwardly on the base of the truck it may then be moved adjacent the container at the bottom, at the same time lifting the edge of the container away from the floor by means of its ring. By then holding the wheels of the truck still, it may be tipped rearwardly, raising the container completely from the floor until the truck occupies the position shown in Fig. 1. In this position the truck and container are substantially balanced and the handles are in the correct position for the user to hold them at the natural place for pushing the truck around.

The wheels of the truck are set forwardly so that when the truck engages the container, the center line of the wheels is ahead of the edge of the container. This makes it easy to tilt the truck rearwardly to pick the container off the floor. The clamping member is operated by the foot of the user and is in such a position that the user naturally pushes downwardly upon the bent lower end of the hook in shoving the truck adjacent the container. The user also naturally keeps his foot upon this bent end when he tilts the truck backwardly to raise the container. He thus clamps the container tight at these times, but does not have to make a special effort as this is the natural way of using the truck.

The present truck is very simple to construct and is made up of few parts which may be easily and quickly assembled. The parts are strong and the truck easy to manipulate even in close quarters. It may be stood up anywhere as shown in Fig. 2 and occupies but little space. It may also be readily adjusted for different sizes of containers.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention.

1. In a truck for metal containers and the like, the combination of a frame adapted to receive a container and provided with traction wheels, and clamping means mounted on said frame and adapted to engage with an upper reinforcing ring of the container to secure said container to said frame, whereby said container may be lifted by said ring by tilting said truck.

2. In a truck for metal containers and the like, the combination of a frame adapted to receive a container and provided with traction wheels, a lifting block mounted on said frame and adapted to be engaged under the reinforcing ring of the container to be lifted, and clamping means mounted on said frame and adapted to hold said container ring over said lifting block whereby said container may be lifted by tilting said truck.

3. In a truck for metal containers and the like, the combination of a frame adapted to receive a container and provided with traction wheels, a lifting block adjustably mounted on said frame and adapted to be engaged under the reinforcing ring of the container to be lifted, and clamping means adjustably mounted on said frame and adapted to hold said container ring over said lifting block whereby said container may be lifted by tilting said truck.

4. In a truck for metal containers and the like, the combination of a frame adapted to receive a container and provided with traction wheels, a lifting block mounted on said frame and adapted to be engaged under the reinforcing ring of the container to be lifted, and a clamping member movably mounted on said frame and adapted to be engaged over the upper edge of said container to hold the same securely in place on said lifting block whereby said container may be lifted by tilting said truck.

5. In a truck for metal containers and the like, the combination of a frame adapted to receive a container and provided with traction wheels, a cross member on said frame, a lifting block on said cross member adapted to be engaged under the upper reinforcing ring of said container and a clamping member movably attached to said cross member and adapted to be moved into engagement with the upper edge of the container to hold the reinforcing ring securely in place over said lifting block whereby said container may be lifted by its reinforcing ring by tilting said truck.

6. In a truck for metal containers and the like, the combination of a frame adapted to receive a container and provided with traction wheels, a slotted cross member on said frame, a curved lifting block on said cross member adapted to be engaged under the upper reinforcing ring of said container and a clamping member movably mounted through the slot in said cross member and adapted to be moved into engagement with the upper edge of said container to secure the reinforcing ring in position over said lifting block to permit the lifting of said container by tilting said truck.

7. In a truck for metal containers and the like, the combination of a frame provided with a base having curved arms adapted to partially encircle the container, traction wheels mounted in said base ahead of the line of the edge of the container, said base being slotted, a slotted cross member on said frame, a curved lifting block on said cross member adapted to be engaged under the upper reinforcing ring of said container, a clamping member movably mounted through the slots in said base and cross member and being adapted to be moved into engagement with the upper edge of said container to secure the reinforcing ring in position over said lifting block to permit the lifting of said container by tilting said truck.

8. In a truck for metal containers and the like, the combination of a suitable base member having two forwardly and downwardly extending curved arms adapted to partially encircle a container, traction wheels mounted in said base member, a frame mounted in said base member and being bent backwardly at a point above the height of a container to be lifted, said frame being provided with handles at its outer end, and clamping means on said frame adapted to removably engage with the upper reinforcing ring of the container to permit the barrel to be lifted by said ring upon tilting of said truck, said truck and container being adapted to be substantially balanced when tilted to a position to bring the handles in the correct position to push the truck.

Signed by me, this 10th day of October, 1919.

HERBERT B. SABIN.